3,362,789
PROCESS FOR MAKING HIGH STRUCTURE OIL FURNACE CARBON BLACK
John F. Hardy, Andover, and Merrill E. Jordan, Walpole, Mass., assignors to Cabot Corporation, Boston, Mass., a corporation of Delaware
No Drawing. Filed Sept. 15, 1964, Ser. No. 396,744
10 Claims. (Cl. 23—209.4)

ABSTRACT OF THE DISCLOSURE

High structure oil furnace blacks are produced by operating an oil furnace process so as to produce an aerosol comprising carbon black and certain concentrations of hydrocarbonaceous material. Said aerosol is then heat-treated, prior to substantial cooling thereof, in an inert or non-oxidizing atmosphere in order to reduce the hydrocarbonaceous material content. The resulting black product is highly structured; i.e. said product black has an oil absorption factor: average particle diameter ratio of at least about 6.

---

Oil furnace carbon blacks are important articles of commerce being extremely useful, for example, as fillers, pigments and reinforcing agents in rubbers and plastics. Broadly, the oil furnace process comprises cracking and/or incompletely combusting an essentially fluid hydrocarbon feedstock in an enclosed conversion zone at temperatures above about 1800° F. to produce carbon black. The carbon black entrained in the gases emanating from the conversion zone is then cooled and collected by any suitable means. Said process has been found to be extremely advantageous in that precise control of the properties of the carbon black product can be achieved.

Heretofore, however, it has been extremely difficult and normally not commercially feasible to produce oil furnace blacks having extremely high "structure" by way of the oil furnace process. Blacks having high structure are generally well suited for particular applications such as gelling agents, batteries, fillers for tar bonded refractories, etc. Heretofore, such blacks have been generally produced commercially from acetylene, which compound is expensive and contributes substantially to high product cost. In accordance with the process of the present invention, however, less costly oil furnace blacks having high "structure" can be produced.

It is a principal object of the present invention to provide a novel process for the production of oil furnace blacks.

It is another object of the present invention to provide a process for producing high structure oil furnace blacks.

Other objects and advantages of the present invention will in part be obvious and will in part appear hereinafter.

The term "structure" relates to a primary property of carbon black which is not influenced consistently by any property or combination of properties. In general, the term is used in the art to designate the extent of aggregation of the primary particles of a black and said aggregation is best evaluated by electron microscope examination. Since all furnace blacks manifest some degree of aggregation of the primary particles, a particular black is classified as being a low, normal or high structure black depending upon the relative degree of aggregation manifested thereby. Delineation between the classifications of low, normal or high structure are generally not well defined. An expression has been derived, however, which is considered by those skilled in the art as being generally indicative of the structure of a black. Said expression is the ratio of oil absorption factor of a particular black to the average particle diameter thereof.

In general, the classification of a black as low, normal or high structure will vary directly with the value for said ratio. In accordance with the process of the present invention, furnace carbon blacks having a significantly higher value for said ratio are readily produced. In particular, however, high structure blacks, i.e. those blacks having oil absorption/average particle diameter ratios of greater than about 6 and preferably greater than about 8 when the oil absorption factor is expressed in terms of lbs. oil/100 lbs. black and the average particle diameter is expressed in millimicrons are produced in accordance with the present invention. For purposes of comparison with the blacks producible in accordance with the process of the present invention, there are listed in the following table some typical currently available oil furnace blacks produced by Cabot Corporation.

TABLE I

| Black | Surface area, m.²/gram | Av. electron microscope part. diam. (millimicrons) | Oil absorp. (lbs. oil/100 lbs. black) (Gardener) | Ratio, OA/part. diam. |
|---|---|---|---|---|
| Regal 300 | 84 | 26 | 90 | 3.46 |
| Vulcan 3 (HAF) | 74 | 29 | 135 | 4.66 |
| Vulcan 6 (ISAF) | 115 | 23 | 125 | 5.43 |
| XC-72 (XCF) | 190 | 29 | 225 | 7.75 |

In accordance with the process of the present invention it was discovered that said oil furnace blacks having unusually high structure are produced when carbon black is formed in a free carbon forming zone under conditions which result in a mixture comprising in addition to carbon black, between about 2 and about 30%, and preferably between about 5 and about 20%, by weight of the black of hydrocarbonaceous materials and the resulting mixture, while still entrained in the flue gases and prior to substantial cooling thereof, is heat treated at elevated temperatures.

The hydrocarbonaceous materials mentioned hereinabove comprise unconverted and/or incompletely converted hydrocarbon feedstock introduced to the conversion zone. It is pointed out that normally free carbon forming conditions which produce relatively high proportions of hydrocarbonaceous materials with respect to carbon black product are stringently avoided because such conditions result in an inefficient conversion of the feedstock. Further, the presence of relatively large amounts of hydrocarbonaceous materials associated with carbon black generally results in undesirable properties such as severe agglomeration in the product black.

The conversion zone conditions required to produce a mixture comprising in addition to carbon black at least about 2% and preferably at least about 5% by weight of the black of hydrocarbonaceous materials are well known to the art. Generally speaking, any conditions which will produce either singly or in combination relatively low turbulence, short residence times, low overall combustion rates and relatively low temperatures will result in the presence of higher proportions of hydrocarbonaceous materials in the resulting product. Said conditions can be controlled in many ways. For instance, lower residence time and lower turbulence for a given volume flow of feedstock, fuel gas and combustion air (or other molecular oxygen containing gas) can be achieved by increasing the cross-sectional area of the conversion zone and/or by shortening said zone. The combustion rates and temperatures of a particular conversion zone at a given flow of feedstock can be lowered by a reduction in the amount of combustion air introduced thereto. It should be noted that, in general, the above-mentioned conditions are at least somewhat interrelated. Thus, the exact operating conditions required to produce a given black associated with a given amount of hydrocarbonaceous materials are best determined during actual operations.

Generally speaking, the heat treatment at elevated temperatures is accomplished by heating the conversion zone effluent to a temperature above about 2400° F. and preferably above about 2600° F. for a period of time sufficient to reduce the total hydrocarbonaceous material to less than about 1% and preferably less than about 0.5% and most preferably less than about 0.1% by weight and to thereby provide in the resulting black product higher structure. When, however, the effluent is allowed to cool substantially (i.e. if the temperature of the effluent decreases to less than about 1000° F. and especially to less than about 500° F. prior to heat treatment thereof) the amount of increased structure derived is normally substantially reduced. Moreover, as has been mentioned above, upon cooling agglomeration of the black particles can occur.

The residence time required in the heat treatment zone to produce a black having a given structure is to a large extent dependent not only upon the treatment temperatures to which the conversion zone effluent is subjected and the temperature profile of the heat treatment zone, but also upon various parameters involved in the conversion of the fluid hydrocarbon to carbon black such as, the type of hydrocarbon feedstock utilized, the temperature of the conversion zone, the rates at which fuel gas, air and fluid hydrocarbon are charged to said zone, the geometry and size of the carbon black producing apparatus, and the like. Other parameters which can also affect the residence time required in the heat treatment zone are: the particular method utilized to heat said zone, the rate of transfer of heat to the conversion zone effluent undergoing treatment, dilution of the carbon black in the flue gases, the rate at which the carbon black flows through said zone, etc. The influence of each of these variables is understood by those skilled in the art and manipulation of any or all of said variables is readily within the ambit of one so skilled. Thus, the exact residence time required for heat treatment in any particular case is best determined during operations, and can generally be readily controlled, for instance, by altering one or a combination of the parameters mentioned hereinabove.

It should be noted and understood that although the present discussion has thus far treated the conversion zone and the heat treatment zone as being separate, physical partition of said zones is not strictly necessary. The process of the present invention can be effected when the conversion and heat treatment zones are adjacent or even somewhat overlapping.

Although any means of heating the treatment zone is generally satisfactory, we find that sufficient heat can be conveniently provided to said zone when combustion of a suitable fuel is accomplished in a fuel combustion zone separate from the heat treatment zone and the resulting hot products of combustion are charged into the heat treatment zone.

However, in supplying heat to the heat treatment zone by the combustion of a fuel, several precautions must be observed. It is, for instance, important that the fuel be chosen so as to (a) provide sufficient heat to the heat treatment zone (i.e. sufficient to raise the temperature within said zone to at least above about 2400° F.), and (b) produce combustion products which will not substantially react with or deleteriously affect the carbon black product. Although any fuel which meets the above requirements is entirely satisfactory, we find petroleum fuels and particularly gaseous (at STP) petroleum fuels to be generally preferable. Obviously, any fuel gas utilized in the free carbon black forming zone is also generally suitable for use in heating the heat treatment zone, and such gases are, in general, preferred because they are readily available and economical. Specific examples of suitable fuel gases are: natural gas, propane, methane, ethane, ethylene, butane, butene, acetylene, carbon monoxide, etc., either alone or as mixtures. Generally speaking, fuels such as dimethyl sulfide or ethyl chloride which produce sulphurous or halogenous products upon combustion should be avoided.

Moreover, it is also important that the hot combustion gases charged to the heat treatment zone be substantially free of molecular oxygen and/or other oxidizing substances. If substantial amounts of molecular oxygen and/or other oxidizing substances are introduced to the heat treatment zone, the carbon black undergoing heat treatment can react therewith at the high temperatures encountered. Thus, it is important that the amount of air or other molecular oxygen-containing gas supplied to the fuel combustion zone not be substantially in excess of stoichiometric amounts for complete combustion of the fuel.

There follow a number of a non-limiting illustrative examples:

Example 1

To one end of a refractory lined furnace about 22 feet long and 27 inches in diameter, there is continuously charged under relatively non-turbulent conditions about 1200 s.c.f.h. of natural gas and about 18,000 s.c.f.h. air. The mixture is ignited and the combustion thereof allowed to continue until the interior temperature of the furnace about 8 feet from the upstream end is about 2400° F. Next, the air rate is increased to 32,900 s.c.f.h. and Sunray D-X fuel oil, a cycle stock sold by D-X Sunray Oil Corporation and preheated to about 400° F., is charged to the reaction zone at a rate of about 61 gallons per hour and the resulting reaction is allowed to continue for about 4 hours while the reaction products are continuously withdrawn from the downstream end of the furnace through cyclone type cooling and collection apparatus. Periodic samplings of the conversion zone effluent, i.e. the carbon black/flue gas mixture are tested by gas chromatographic analysis and it is found that said effluent comprises an average hydrocarbonaceous material content of about 10% based on the weight of carbon black product. During carbon black production, the temperature of the furnace interior located about 8 feet from the upstream end thereof is continuously monitored and it is found that said temperature rises to and remains at about 2300° F. throughout the run. The surface area, oil absorption and average particle diameter of the carbon black product are determined, the results of which determinations are shown in Table II below.

About 1100 lbs. of carbon black is collected which corresponds to a yield of about 4.5 lbs. of carbon black/gallon of fuel oil.

Example 2

This example is a duplicate of Example 1 with the exception that after starting of introduction of the Sunray D-X fuel oil, heat treatment of the conversion zone effluent is effected. Said heat treatment is accomplished by continuously charging to a heated highly turbulent combustion furnace about 2500 s.c.f.h. of natural gas and about 25,000 s.c.f.h. air, the resulting combustion products being continuously charged into the carbon black producing furnace through a port located about 10 feet from the downstream end thereof. The temperature of said combustion gases at the point of entry thereof into the carbon black producing furnace is about 3300° F. The temperature of the resulting mixture of conversion zone effluent and combustion gases 2 feet downstream said port is found to be about 2750° F. After about 4 hours of operations at the above conditions, the run is discontinued and the collected carbon black is subjected to the same determinations as was the carbon black product in Example 1. The results are set forth in Table II below. The weight of the collected carbon black is determined to be about 1266 lbs. which corresponds to a yield of about 5.19 lbs. carbon black/gallon of fuel oil.

Example 3

In this example, 250 lbs. of carbon black produced in Example 1 is cooled, collected and charged to a bed which is fluidized by the flue gases produced in a combustion furnace. Thus heat treatment of the fluidized bed is accomplished in much the same manner as shown in Example 2, i.e. by continuously charging to a heated combustion furnace about 2500 s.c.f.h. of natural gas and about 20,000 s.c.f.h. of air, the resulting combustion products being continuously charged into the base of said bed. The interior temperature of said bed is found to be about 2750° F. Said fluidized bed is maintained at the above conditions for about 5 minutes at the end of which period of time the operation is discontinued.

The heat treated carbon black is collected and analyzed as was the carbon black product in Example 1. The results of said analyses are set forth in Table II below.

Example 4

This example is a duplicate of Example 2 with the exception that the carbon black producing conversion zone is operated under conditions which produce less than about 1% hydrocarbonaceous materials based on the weight of carbon black product. Accordingly, there is continuously charged to and burned within the furnace about 1000 s.c.f.h. of natural gas and about 15,000 s.c.f.h. air. After the interior temperature of the furnace reaches about 2400° F. the air rate is increased to 42,300 s.c.f.h. and fuel oil preheated to about 400° F. is charged thereinto at a rate of about 60.5 gallons per hour. The interior temperature of the furnace rises to and stabilizes at about 2600° F. Samples of the conversion zone effluent are withdrawn periodically and analyzed for hydrocarbonaceous materials and it is found that only about 0.5% hydrocarbonaceous materials are present based on the weight of the carbon black product. Samples of the carbon black product are analyzed for surface area, oil absorption and average particle diameter, the results of which analyses are shown in Table II. After about 2 hours of operation under these conditions, the carbon black is collected and weighed and it is found that about 381 lbs. of carbon black are produced which corresponds to a yield of about 3.15 lbs. carbon black/gallon fuel oil.

Example 5

The carbon black operation of Example 4 is continued under the conditions set forth in Example 4, but heat treatment of the conversion zone effluent is effected in the manner of Example 2. The temperature of the conversion zone effluent is thereby raised to about 2800° F. After about two hours the carbon black product and heat treating operations are discontinued. The carbon black product is analyzed and the results are shown in Table II. It is further found that the yield of carbon black is about the same as in Example 4.

TABLE II

|  | Particle dia. (average) electron microscope | Oil absorption factor (Gardener Method) |  | OA/P. dia. |
|---|---|---|---|---|
| Example 1 | 41 | 2.9 | 272 | 6.63 |
| Example 2 | 41 | 3.85 | 362 | 8.83 |
| Example 3 | 41 | 3.0 | 282 | 6.88 |
| Example 4 | 29 | 2.40 | 225 | 7.75 |
| Example 5 | 29 | 2.41 | 226 | 7.78 |

Obviously, many changes can be made in the above examples and description without departing from the scope of the invention.

For instance, although only natural gas was utilized in the above examples as the fuel to provide hot combustion products to the heat treatment zone, other fuels such as methane, propane and carbon monoxide are also suitable.

Furthermore, it is obvious that although heat was provided to the heat treatment zone in the above examples by charging hot combustion gases thereto, other methods of heating said zone which are capable of heating the conversion zone effluent to temperatures above about 2400° F. are also suitable.

Also, clearly, the heat treatment zone need not be located within the conversion furnace or abutting the conversion zone, but can be entirely separated therefrom so long as the precaution of subjecting the conversion zone effluent to said heat treatment before substantial cooling and agglomeration of the black occurs is observed.

Accordingly, it is intended that the above disclosure be regarded as illustrative and as in no way limiting the scope of the present invention.

What we claim is:

1. A process for producing oil furnace carbon black having extremely high structure which comprises adjusting the conditions in an oil furnace carbon black forming zone to produce an aerosol effluent comprising in addition to carbon black and flue gases between about 2 and about 30% by weight of said black of hydrocarbonaceous material and, prior to substantial cooling thereof, treating (subjecting) said aerosol in a substantially non-oxidizing atmosphere to temperatures above about 2400° F. for a period of time sufficient to reduce the hydrocarbonaceous material content of the aerosol to less than about 1% by weight of the black contained therein.

2. The process of claim 1 wherein the areosol produced in said oil furnace carbon black forming zone comprises between about 5 and about 20% by weight of the black of hydrocarbonaceous materials.

3. The process of claim 1 wherein after being subjected to said temperatures, the aerosol comprises less than about 0.5% by weight of the black of hydrocarbonaceous materials.

4. The process of claim 1 wherein after being subjected to said temperatures, the aerosol comprises less than about 0.1% by weight of the black of hydrocarbonaceous materials.

5. The process of claim 1 wherein the aerosol produced in said oil furnace carbon black forming zone is treated at temperatures above about 2600 F.

6. The process of claim 1 wherein the ratio of oil absorption expressed in lbs. oil/100 lbs. black to average particle diameter expressed in millimicrons of the resulting carbon black product is greater than about 6.

7. The process of claim 1 wherein the ratio of oil absorption expressed in lbs. oil/100 lbs. black to average particle diameter expressed in millimicrons of the resulting carbon black product is greater than about 8.

8. The process of claim 1 wherein the aerosol effluent of the oil furnace carbon black forming zone is heated to temperatures above about 2400° F. by mixing said aerosol with a hot non-oxidizing gas.

9. The process of claim 8 wherein said hot non-oxidizing gas comprises the hot combustion products resulting from the reaction of a gaseous petroleum fuel and a substance chosen from the class consisting of air and oxygen.

10. The process of claim 9 wherein about a stoichiometric quantity of said substance is reacted with said petroleum fuel.

References Cited

UNITED STATES PATENTS

| 2,495,925 | 1/1950 | Foster et al. | 23—209.9 |
| 2,564,700 | 8/1951 | Krejci | 23—209.4 |
| 2,643,182 | 1/1953 | Williams | 23—209.6 |
| 3,235,334 | 1/1966 | Kelmers | 23—209.4 |
| 3,307,911 | 3/1967 | Krejci | 23—209.4 |

EDWARD J. MEROS, *Primary Examiner.*

UNITED STATES PATENT OFFICE
CERTIFICATE OF CORRECTION

Patent No. 3,362,789                                    January 9, 1968

John F. Hardy et al.

It is hereby certified that error appears in the above numbered patent requiring correction and that the said Letters Patent should read as corrected below.

Column 6, line 24, strike out "(subjecting)".

Signed and sealed this 10th day of June 1969.

(SEAL)
Attest:

Edward M. Fletcher, Jr.                                WILLIAM E. SCHUYLER, JR.
Attesting Officer                                            Commissioner of Patents